: US 8,292,262 B2
(45) Date of Patent: Oct. 23, 2012

(12) United States Patent
Hasunuma et al.

(54) FLOW CONTROL VALVE

(75) Inventors: Masahiro Hasunuma, Gyoda (JP);
Yoshihiro Ushigusa, Gyoda (JP)

(73) Assignee: Surpass Industry Co., Ltd., Saitama (JP)

( * ) Notice: Subject to any disclaimer, the term of this patent is extended or adjusted under 35 U.S.C. 154(b) by 351 days.

(21) Appl. No.: 11/665,997

(22) PCT Filed: Oct. 26, 2005

(86) PCT No.: PCT/JP2005/019708
§ 371 (c)(1),
(2), (4) Date: Apr. 23, 2007

(87) PCT Pub. No.: WO2006/046612
PCT Pub. Date: May 4, 2006

(65) Prior Publication Data
US 2009/0072173 A1  Mar. 19, 2009

(30) Foreign Application Priority Data

Oct. 29, 2004 (JP) ................................. 2004-316969
Jun. 1, 2005 (JP) ................................. 2005-161472

(51) Int. Cl.
*F16K 31/02* (2006.01)
(52) U.S. Cl. ......... 251/129.05; 251/129.08; 251/129.12; 251/331; 251/335.2; 137/513.3; 137/846
(58) Field of Classification Search ............ 251/129.11, 251/129.12, 129.05, 129.08, 331, 335.2; 137/513.3, 846
See application file for complete search history.

(56) References Cited

U.S. PATENT DOCUMENTS

| 2,555,996 | A | * | 6/1951 | Pontius ......................... 251/271 |
| 3,315,844 | A | * | 4/1967 | Klasson et al. ................. 222/61 |
| 3,859,259 | A | * | 1/1975 | Harrell et al. ............... 525/326.3 |
| 4,794,314 | A |   | 12/1988 | Janu et al. |
| 5,461,290 | A | * | 10/1995 | Tice ............................... 318/266 |
| 6,053,194 | A | * | 4/2000 | Nelson et al. .................... 137/70 |
| 6,092,782 | A | * | 7/2000 | Yamada et al. .......... 251/129.04 |
| 6,123,320 | A |   | 9/2000 | Rasanow et al. |

(Continued)

FOREIGN PATENT DOCUMENTS

GB   1091851   11/1967

(Continued)

OTHER PUBLICATIONS

Official Action issued by the Japanese Patent Office on Sep. 30, 2011 in corresponding Japanese Patent Application No. 2005-161472.

(Continued)

*Primary Examiner* — John K Fristoe, Jr.
*Assistant Examiner* — Marina Tietjen
(74) *Attorney, Agent, or Firm* — Young & Thompson

(57) ABSTRACT

An object is to provide a flow control valve that is capable of reducing or eliminating backlash generated between a male threaded portion and a female threaded portion engaged with the male threaded portion and preventing or eliminating hysteresis in the flow level. The flow control valve includes a body having a fluid inlet and a fluid outlet, a cover attachable to the body, a motor disposed in a space defined by the body and the cover, a valving element connected to a rotary shaft of the motor with a screw member, and an urging member that urges the valving element toward the motor side or toward the side opposite to the motor.

14 Claims, 8 Drawing Sheets

U.S. PATENT DOCUMENTS

| | | |
|---|---|---|
| 6,230,738 B1 | 5/2001 | Watanabe et al. |
| 6,321,776 B1 | 11/2001 | Pratt et al. |
| 2003/0006389 A1* | 1/2003 | Fukano et al. ........... 251/129.11 |

FOREIGN PATENT DOCUMENTS

| | | |
|---|---|---|
| JP | 53-95316 | 8/1978 |
| JP | 58-60060 | 4/1983 |
| JP | 62-209279 | 9/1987 |
| JP | 4-41180 | 4/1992 |
| JP | 10-299913 | 11/1998 |
| JP | 11-125355 | 5/1999 |
| JP | 11-280526 | 10/1999 |
| JP | 2001-12632 | 1/2001 |
| JP | 2001-99347 | 4/2001 |
| JP | 2003-202084 | 7/2003 |
| JP | 2004-19792 | 1/2004 |
| JP | 2004-052797 | 2/2004 |
| JP | 2003-529031 | 9/2004 |
| JP | 2004-245366 | 9/2004 |
| JP | 2004-251462 | 9/2004 |

OTHER PUBLICATIONS

Extended European Search Report issued Jul. 17, 2012 by the European Patent Office in corresponding European Patent Application No. 05805324.0, 6 pages.

* cited by examiner (a)

(b)

FLOW CONTROL VALVE

TECHNICAL FIELD

The present invention relates to a flow control valve that controls the flow of a fluid and that is used for fluid transport pipes used in, for example, various industrial fields including chemical plants, semiconductor production, food products, and biotechnology.

BACKGROUND ART

There is a known flow control valve that is capable of adjusting the flow of a fluid by rotating, clockwise or counter-clockwise, a rotary shaft of a motor so as to raise or lower a lift body having a push stop piece provided at the lower edge so that the push stop piece squeezes a fluid adjustment tube in the diameter direction or releases the pressure (for example, refer to Patent Document 1).

Patent Document 1:
Japanese Unexamined Patent Application, Publication No. 2004-52797

DISCLOSURE OF INVENTION

However, with such a flow control valve, there is a problem in that backlash (chattering) is generated between a male threaded portion provided on the rotary shaft of the motor and a female threaded portion provided on a nut portion that is raised and lowered together with the lifting body and that engages with the male threaded portion, and thus, hysteresis occurs in the flow.

With a flow control valve configured to convert the rotation of a rotary shaft of a motor into displacement in a direction along a rotary shaft of a valving element by connecting the rotary shaft of the motor and the valving element with a screw member, no problems occur when the valving element is moved within the movable range. However, with the flow control valve having this configuration, when the rotation of the rotary shaft of the motor exceeds the movable range of the valving element, for example, the screw member may be overscrewed. Depending on the degree of overscrewing, the problem of the motor not being able to operate may occur.

When the flow control valve is a motor-driven needle valve in which the position of a valving element (needle) is adjusted by a control device, it is necessary for the control device to accurately determine the current position of the valving element (i.e., the degree of opening of the needle valve) to accurately control the flow.

The position of the valving element may be determined on the basis of, for example, position information of the valving element at the operation start time of the flow control valve and information about the amount of rotation of the rotary shaft of the motor from the operation start time of the flow control valve to the position detection time. However, to detect the amount of rotation of the rotary shaft of the motor, a rotary encoder, which is more expensive than a motor, is required, and, therefore, the flow control valve becomes extremely expensive. Furthermore, providing a rotary encoder means that the size of the flow control valve becomes large.

The present invention has been achieved in light of the issues described above. An object of the present invention is to provide a flow control valve capable of reducing the backlash generated between the male threaded portion and the female threaded portion engaged with the male threaded portion, thus preventing hysteresis of the flow, reliably preventing problems such as overscrewing of the screw member driving the valving element, and accurately determining the position of the valving element without using an expensive rotary encoder.

The present invention employs the following solutions to solve the problems described above.

The present invention provides a flow control valve including a body having a fluid inlet and a fluid outlet; a cover attachable to the body; a motor disposed in a space defined by the body and the cover; a valving element connected to a rotary shaft of the motor with a screw member; and an urging member that urges the valving element toward the motor side or toward the side opposite to the motor.

According to the present invention, the valving element is constantly urged by the urging member toward the motor side or the side opposite to the motor side. Since the threaded portion is always in a biased state, backlash (chattering) generated at the threaded portion is reduced or eliminated, and hysteresis in the flow level can be prevented or eliminated.

According to a first aspect of the present invention, the urging member according to the above-described invention is configured such that the direction of force applied to the valving element by a fluid flowing around the valving element and the direction of the urging force of the urging member are substantially the same.

In this way, a combined force of the force applied to the valving element by a fluid flowing around the valving element and the urging force of the urging member is applied to the threaded portion. Since the biased force (friction) applied to the threaded portion can be increased, the backlash (chattering) generated at the threaded portion is reduced or eliminated, and hysteresis in the flow level can be prevented or eliminated.

According to a second aspect of the present invention, the above-described invention is configured such that packing that separates the space into the motor side and the valving element side is provided, and the packing is made of material that does not permit passage of vaporized chemical solution.

In this way, for example, packing made of fluoro-rubber (FKM) separates the motor side space and the valving element side space, and a fluid, such as vaporized hydrofluoric acid, hydrochloric acid, or nitric acid, is prevented from flowing from the valving element side to the motor side. Therefore, corrosion of the motor disposed at the motor side space can be prevented.

Furthermore, by employing such packing, vaporized hydrofluoric acid, hydrochloric acid, or nitric acid does not flow into the motor side space. Therefore, the components disposed at the motor side space may be made of metal.

According to a second aspect of the present invention, it is preferable that a discharge channel that discharges a fluid accumulated on a side closer to the valving element than the packing be provided.

In this way, fluid accumulated on the side closer to the valving element than the packing can be quickly discharged outside the flow control valve.

According to the above-described structure, it is preferable that a check valve be provided inside the discharge channel.

In this way, ambient air is prevented from flowing back inside through the discharge channel.

According to a third aspect of the present invention, the above-described invention is further provided with a positioning reference surface provided on the motor and a fixing member that fixes the motor to the body. The fixing member includes a positioning surface for positioning the motor and for receiving the positioning reference surface of the motor so as to set at least one of a position and an orientation of the rotary shaft suitable for driving the valving element.

In this way, by contacting the positioning reference surface of the motor to the positioning surface of the fixing member provided on the body, the position or orientation of the rotary shaft of the motor, or both the position and orientation, is set in a manner appropriate for driving the valving element. Therefore, the position adjustment operation or orientation adjustment operation of the motor with respect to the body, or both the position adjustment operation and orientation adjustment operation, will be unnecessary.

Therefore, highly accurate assembly can be carried out easily and quickly during production of the flow control valve or during maintenance, regardless of the level of technical skill of the assembly worker. In addition, productivity and ease-of-operation are excellent, and the variation in assembly accuracy from product to product or in each maintenance operation is reduced. Thus, the level of performance of the flow control valve can be kept high.

Here, the positioning reference surface may be constituted of at least one curved surface or a plurality of flat surfaces including at least one surface that is orientated in a direction different from that of the other surfaces. When the positioning reference surface is a curved surface, the positioning surface is constituted of a curved surface having the same curvature but in the opposite direction as that of the positioning reference surface. When the positioning reference surface is constituted of a plurality of flat surfaces, the positioning surface is also constituted of a plurality of flat surfaces corresponding to those of the positioning reference surface.

According to the above-described structure, it is preferable that the positioning reference surface of the motor constitute a cylindrical surface or a cylindrical inner surface parallel to the rotary shaft, the positioning surface of the fixing member constitute a cylindrical inner surface or a cylindrical surface that is parallel to a driving direction of the valving element and the same shape as the positioning reference surface, and the position and orientation of the rotary shaft be determined while the positioning surface receives the positioning reference surface.

In this way, when the positioning reference surface of the motor is a cylindrical surface, the positioning surface of the fixing member and the positioning reference surface have a cylindrical inner surface that are substantially the same shape, and the motor and the fixing member are engaged by inserting the positioning reference surface of the motor into the inner circumference of the positioning surface of the fixing member. In this way, both the position and the orientation of the motor with respect to the body are determined.

When the positioning reference surface of the motor is a cylindrical inner surface, the positioning surface of the fixing member and the positioning reference surface have a cylindrical surface that are substantially the same shape, and the motor and the fixing member are engaged by inserting the positioning surface of the fixing member into the inner circumference of the positioning reference surface of the motor. In this way, both the position and the orientation of the motor with respect to the body are determined.

In other words, since the motor and the fixing member are connected by a so-called spigot, by simply connecting the motor and the fixing member, both the position and the orientation of the motor with respect to the body can be determined, thus facilitating production.

According to a fourth aspect of the present invention, the above-described invention is further provided with a stopper that allows the valving element to move within a predetermined operation range and receives the valving element upon reaching an end of the operation range to prevent the valving element from moving outside the operation range.

In this case, the operation range of the valving element is predetermined, and when the valving element reaches the end of the operation range (the boundary between the operation range and outside the operation range), the stopper receives the valving element so as to limit the valving element from moving further. Therefore, problems such as overscrewing of the threaded portion can be reliably prevented.

With this flow control valve, the predetermined operation range is the actual movable range of the valving element.

According to a fifth aspect of the present invention, the above-described invention is further provided with a control device that controls the operation of the motor. The control device operates the motor with a first driving torque at least when the valving element moves toward the end when in the vicinity of the end of the movable range. The control device operates the motor with a second driving torque that is greater than the first driving torque when the valving element moves away from the end in the movable range.

In this way, when the valving element is moved away from the end of the movable range, the control device that controls the operation of the motor operates the motor with a second driving torque greater than the driving torque (first driving torque) applied to move the valving element toward the end of the movable range.

In this way, with this flow control valve, even if overscrewing of the threaded portion occurs when the valving element moves to the end of the movable range, the overscrewing can be easily released.

Here, the driving torque of the motor is proportional to the magnitude of the driving current input to the motor.

The control device sets the output limit value of the driving current of the motor to a first limit value when the valving element is moved to the end of the movable range and sets the output limit value to a second limit value that is greater than the first limit value when the valving element is moved away from the end of the movable range. In this way, the driving torque of the motor when the valving element is moved away from the end of the movable range can be set to a value greater than the driving torque of the motor when the valving element is moved to the end of the movable range.

Moreover, in general, with the motor, the lower the rotational speed of the rotary shaft is, the greater the torque for driving the rotary shaft is.

The control device rotates the rotary shaft of the motor with a first rotational speed when the valving element is moved to the end of the movable range and rotates the rotary shaft of the motor with a second rotational speed that is slower than the first rotational speed when the valving element is moved away from the end of the movable range. In this way, the driving torque of the motor when the valving element is moved away from the end of the movable range can be set to a value greater than the driving torque of the motor when the valving element is moved to the end of the movable range.

According to a sixth aspect of the present invention, the above-described invention is configured such that the valving element comprises a needle of a needle valve; the motor constitutes a stepping motor that rotates the rotary shaft by an angle proportional to a number of pulses of an input pulsed signal; a control device that controls the position of the valving element by controlling the operation of the motor is provided; to correct the position of the valving element, the control device inputs a pulsed signal having a number of pulses to the motor for rotating the rotary shaft by an angle required for moving the valving element from one end to the other end of the movable range of the valving element; and the control device determines that the valving element is positioned at the other end of the movable range when the rotary shaft is stopped and subsequently controls the position of the valving element within the movable range.

In this way, instead of using a rotary encoder to determine the position of the valving element, the valving element is temporarily moved to the other end of the movable range at an appropriate timing, such as when power is turned on, so as to correct the position. Then, the amount of rotation of the rotary shaft is obtained after the position is corrected on the basis of the number of pulses of the pulsed signal input to the motor. The amount of displacement of the valving element from the other end of the movable range is determined on the basis of the information about the amount of rotation, and the current position of the valving element is determined.

More specifically, a pulsed signal having a predetermined number of pulses is input to the motor so that the control device rotates the rotary shaft of the motor by an angle required for moving the valving element from one end of the movable range to the other end (this angle is obtained from design information of the flow control valve) when the position of the valving element is corrected.

In this way, when the rotation of the rotary shaft is completed, the valving element will be positioned at the other end of the movable range, regardless of the position of the valving element when the position correction operation was started (initial position). When the valving element is at a position other than one end of the movable range when the position correction of the valving element is started, before the rotary shaft is rotated by an angle corresponding to all of the pulses of the pulsed signal input to the motor, the valving element reaches the other end of the movable range and cannot move any further. Therefore, subsequently, the rotary shaft does not rotate, regardless of the remaining number of pulses.

After the valving element is positioned at the other end of the movable range in this way, the control device determines that the valving element is positioned at the other end of the movable range, and position control of the valving element is carried out within the movable range.

Within the movable range, since the rotary shaft rotates by an angle corresponding to all of the pulses of the pulsed signal input to the motor, a predetermined relationship is established between the number of pulses of the pulsed signal and the position of the valving element.

Accordingly, once the valving element is positioned at the other end of the movable range, it is possible to determine the position of the valving element on the basis of the number of pulses of the pulsed signal subsequently input to the motor. Therefore, the position of the valving element can be accurately determined without using a rotary encoder.

According to a seventh aspect of the present invention, it is preferable that, to correct the position of the valving element, the control device rotate the rotary shaft in a direction in which the valving element moves toward an opening side within the movable range.

In this way, when correcting the position of the valving element, the valving element comprising a needle of a needle valve is moved toward the opening side of the movable range, i.e., in a direction preventing interference with another member constituting the needle valve. Therefore, even when position correction of the valving element is repeated, wear of the valving element and needle valve main body is less likely to occur.

According to a eighth aspect of the present invention, the control device operates the motor with a first driving torque at least when the valving element moves toward the end when in the vicinity of the end of the movable range, and the control device operates the motor with a second driving torque that is greater than the first driving torque when the valving element moves away from the end of the movable range.

In this way, when the valving element moves away from the end of the movable range, the control device controlling the operation of the motor operates the motor with a second driving torque that is greater than the driving torque (first driving torque) applied when the valving element moves to the end of the movable range.

In this way, with this flow control valve, even if overscrewing of the threaded portion occurs when the valving element moves to the end of the movable range, the overscrewing can be easily eliminated.

According to an ninth aspect of the present invention, it is preferable that the above-described invention is further provided with a thrust bearing provided on the outside portion of a motor body of the motor, the thrust bearing receiving thrust load applied to the rotary shaft.

In this way, the thrust load transmitted to the rotary shaft through the valving element and the threaded portion when the valving element receives the pressure of a fluid is received by the thrust bearing provided on the outside of the motor main body, and the thrust load is released to the motor main body. Therefore, the load applied to the supporting structure of the rotary shaft inside the motor is reduced, and the motor performance can be maintained for a long period of time.

With the flow control valve according to the present invention, backlash generated between a male threaded portion and a female threaded portion engaged with the male threaded portion can be reduced or eliminated, and hysteresis in the flow level can be prevented or eliminated.

According to the fourth, fifth, and eighth aspects of the present invention, problems such as overscrewing of the threaded portion driving the valving element can be reliably prevented.

According to the sixth aspect of the present invention, the position of the valving element can be accurately determined without using an expensive rotary encoder.

BEST MODE FOR CARRYING OUT THE INVENTION

First Embodiment

A flow control valve according to a first embodiment of the present invention will be described below with reference to the drawings.

Figure 1:
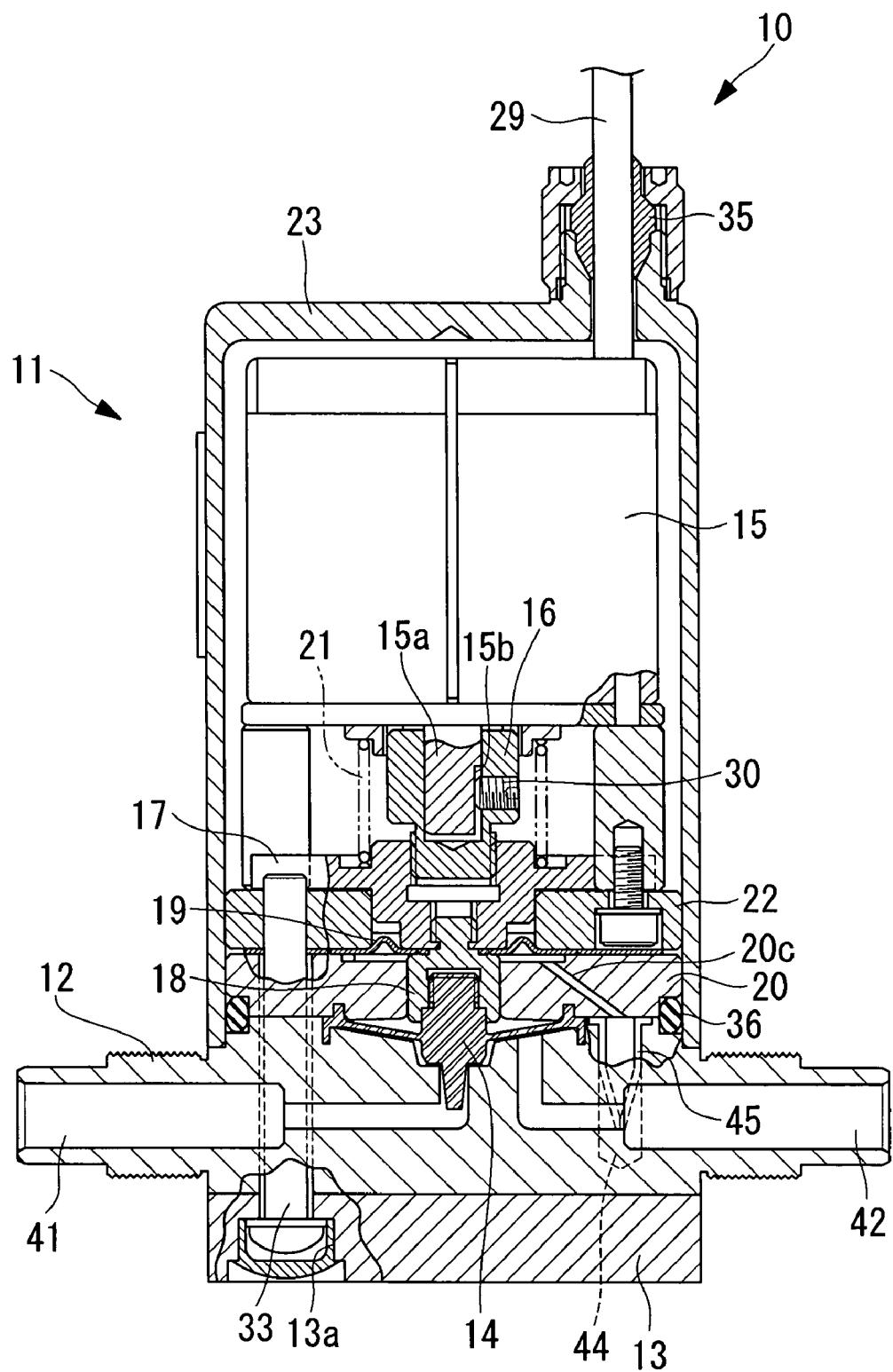
FIG. 1 is a longitudinal cross-sectional view illustrating a needle valve (flow control valve) according to a first embodiment of the present invention.

As shown in FIG. 1, a flow control valve (hereinafter referred to as a "needle valve") 10 according to this embodiment is mainly constituted of a driven portion 11, a body 12, a base 13, and a diaphragm needle (valving element) 14.

The driven portion 11 includes a motor 15, a coupling 16, a slider 17, a stopper 18, packing 19, a diaphragm cover 20, a spring (urging member) 21, a cover flange 22, and a cover 23.

The motor 15 includes, for example, a stepping motor. At the center part of the lower surface of the motor 15, a rotary shaft 15a that protrudes downward and rotates clockwise and counter-clockwise by electrical power supplied via a cable 29. A flat flange surface 15b is provided on part of the rotary shaft 15a. An end surface of a hexagonal socket head screw 30, described below, contacts the flat flange surface 15b.

Figure 2:
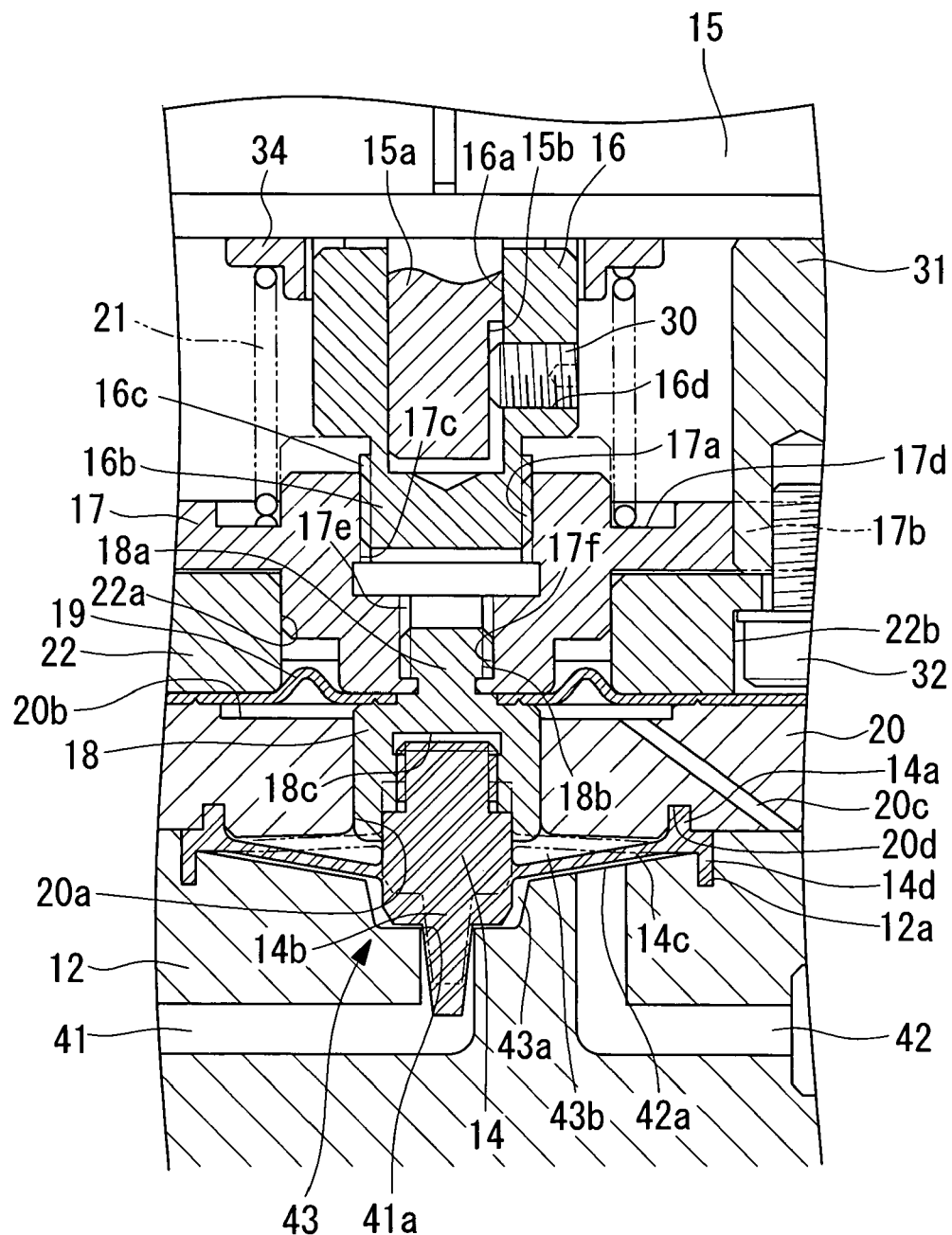
FIG. 2 is an enlarged view of the principal components of FIG. 1.

As shown in FIG. 2, the coupling 16 is a cylindrical member having, at the center part, a depressed portion 16a that receives the rotary shaft 15a. A protruding portion 16b that protrudes downward from the lower edge of the coupling 16 is provided on the coupling 16, causing the overall cross-sectional shape of the coupling 16 to be substantially T-shaped. A male threaded portion 16c is formed on the external surface of the protruding portion 16b and engages with a female threaded portion 17a of the slider 17, as described below.

A through-hole 16d that receives the hexagonal socket head screw 30 is formed in a side wall constituting the depressed portion 16a of the coupling 16. A female threaded portion that engages with the male threaded portion formed on the surface of the hexagonal socket head screw 30 is formed on the surface of the through-hole 16d. By engaging the male threaded portion of the hexagonal socket head screw 30 with the female threaded portion of the through-hole 16d and by screwing the hexagonal socket head screw 30 into the through-hole 16d until the end surface of the hexagonal socket head screw 30 contacts the flat flange surface 15b of the rotary shaft 15a, the coupling 16 is fixed to the rotary shaft 15a of the motor 15.

The slider 17 is raised and lowered along a motor shaft 31 extending downward from the lower end surface of the motor 15. A forked section (not shown) having an inner peripheral surface that contacts the outer peripheral surface of the motor shaft 31 is provided on end sections (left and right end sections in the drawing) 17b of the slider 17.

A first depressed portion 17c that receives the protruding portion 16b of the coupling 16 is formed at the center part of the upper side of the slider 17. The female threaded portion 17a that engages with the male threaded portion 16c of the protruding portion 16b is formed on the surface of the first depressed portion 17c. A depressed groove 17d that is ring-shaped in plan view is formed around the circumferential direction in outer radial direction of the female threaded portion 17a. The depressed groove 17d accommodates a first end surface (the lower end surface in the drawing) of the spring 21.

At the center part of the lower side of the slider 17, a second depressed portion 17e that receives a protruding portion 18a of the stopper 18 is formed. A female threaded portion 17f that engages with a male threaded portion 18b of the protruding portion 18a is formed on the surface of the second depressed portion 17e.

The slider 17 having such a structure is raised and lowered along the motor shaft 31 by the coupling 16 rotating together with the rotary shaft 15a of the motor 15.

The motor shaft 31 is fixed to the cover flange 22 with a screw 32.

The stopper 18 is a cylindrical member having, at the center part, a depressed portion 18c that receives the center part of the diaphragm needle 14. The protruding portion 18a that protrudes upward from the upper edge of the stopper 18 is provided on the stopper 18, causing the overall cross-sectional shape of the stopper 18 to be substantially T-shaped. A male threaded portion 18b is formed on the external surface of the protruding portion 18a and engages with the female threaded portion 17f of the slider 17.

In other words, the stopper 18 is fixed to the slider 17 by screwing the protruding portion 18a into the second depressed portion 17e of the slider 17 and is raised and lowered together with the slider 17.

When screwing the protruding portion 18a of the stopper 18 into the second depressed portion 17e of the slider 17, the inner peripheral edge of the packing 19 is fixed between the stopper 18 and the slider 17.

The packing 19 is a donut-shaped member in plan view and has, at the center part, a circular hole where the protruding portion 18a of the stopper 18 passes through. The packing 19 is made of, for example, fluoro-rubber (FKM). The packing 19 is fixed by interposing the inner peripheral edge between the stopper 18 and the slider 17 and interposing the outer peripheral edge between the diaphragm cover 20 and the cover flange 22.

The diaphragm cover 20 and the cover flange 22 are fixed to the body 12 and the base 13 with a pan-head screw 33 (refer to FIG. 1).

The diaphragm cover 20 has, at the center part, a through-hole 20a that guides the outer peripheral surface of the sidewall of the depressed portion 18c of the stopper 18. The diaphragm cover 20 has, at the center part on the upper surface, a depressed portion 20b. The diaphragm cover 20 has a communication channel 20c that connects its upper surface and lower surface.

A depressed groove 20d that accommodates a protruding portion 14a is formed as an upward-facing ring on the outer peripheral edge of the diaphragm needle 14.

The spring 21 is interposed between a spring seat 34 provided on the lower edge surface of the motor 15 and the depressed groove 17d of the slider 17. The spring 21 is a compression coil spring that constantly urges the slider 17 downward (the direction of the cover flange 22). In this way, the backlash between the female threaded portion 17a of the slider 17 and the male threaded portion 16c of the coupling 16 is reduced (or eliminated).

The cover flange 22 has, at the center part, a through-hole 22a that guides the outer peripheral surface of the sidewall of the first depressed portion 17c of the slider 17. The lower surface of the cover flange 22 and the upper surface of the diaphragm cover 20 sandwich the outer peripheral edge of the packing 19. A depression 22b that accommodates the head portion of the screw 32 is provided on the lower edge of the cover flange 22.

As shown in FIG. 1, the cover 23 is disposed in contact with the upper part of the body 12. The cover 23 accommodates the driven portion 11 described above. A cable packing 35 is interposed between the cover 23 and the cable 29. An O-ring 36 is disposed between the cover 23, and the body 12 and diaphragm cover 20. The cable packing 35 and the O-ring 36 are made of, for example, fluoro-rubber (FKM).

The body 12 is formed in a substantially cubic shape. The body 12 is made of fluororesin, such as polytetrafluoroethylene (PTFE), polychlorotrifluoroethylene (PCTFE), and tetrafluoroethylene perfluoroalkoxy vinyl ether copolymer (PFA).

A fluid inlet portion 41 is provided on one of the side surfaces (the surface on the left side in the drawing) of the body 12. A fluid outlet portion 42 is provided on the other side surface (the surface on the right side in the drawing) positioned opposite to the fluid inlet portion 41 of the body 12.

As shown in FIG. 2, a port 43 that communicates with the fluid inlet portion 41 and the fluid outlet portion 42 is provided at the center part of the upper surface of the body 12. The port 43 has a needle-storing portion 43a that receives a needle portion 14b of the diaphragm needle 14 while the diaphragm needle 14 is in a closed state (the state indicated by solid lines in the drawing). The port 43 has a diaphragm-storing portion 43b that contacts the lower surface of a diaphragm portion 14c of the diaphragm needle 14 while the diaphragm needle 14 is in a closed state.

The needle-storing portion 43a is constituted of a depression having circular shape in plan view. The bottom surface of the needle-storing portion 43a forms a horizontal surface. A liquid inlet 41a that communicates with the fluid inlet portion 41 is formed in the center part of the needle-storing portion 43a. The diaphragm-storing portion 43b is formed on the outer side in the radial direction of the needle-storing portion 43a and above the bottom surface of the needle-storing portion 43a. The diaphragm-storing portion 43b is a concave space shaped like a donut in plan view and is formed in a manner such that the depth gradually decreases from the inner side in the radial direction to the outer side in the radial direction. A liquid outlet 42a is formed in the diaphragm-storing portion 43b.

A depressed groove 12a that accommodates a protruding portion 14d formed at the outer peripheral edge of the diaphragm needle 14 as a ring protruding downward is provided on the upper surface of the body 12.

As shown in FIG. 1, a discharge outlet (not shown in the drawing) is provided in the other side surface (the surface on the deeper side of the plane of the drawing) of the body 12. A discharge channel 44 that communicates with the discharge outlet and the communication channel 20c formed in the diaphragm cover 20 is provided on the side of the other side surface of the body 12. A duckbill 45 is disposed inside the discharge channel 44. The duckbill 45 is a so-called check valve made of; for example, fluoro-rubber (FKM).

The base 13 is a plate-shaped member disposed in contact with the lower surface of the body 12. On the lower edge of the base 13, a depression 13a that accommodates the head portion of the pan-head screw 33 is provided.

With the charger 10 according to this embodiment, when the user operates the motor 15 so as to rotate the rotary shaft 15a of the motor 15 in a first direction (for example, in the clockwise direction in FIG. 1 when viewed from above), the coupling 16 rotates together with the rotary shaft 15a in the first direction. When the coupling 16 rotates, the slider 17 connected with the male threaded portion 16c of the coupling 16 and the female threaded portion 17a of the slider moves upward along the motor shaft 31 (raised). When the slider 17 is raised, the needle portion 14b and the diaphragm portion 14c of the diaphragm needle 14 that is connected to the slider 17 with the stopper 18 are raised together to a fully open state (the state shown in double-dashed chain lines in FIG. 2). As the needle portion 14b is raised, a gap is formed between the liquid inlet 41a and the needle portion 14b, and the valve enters an open state (open). In this way, a fluid flows into the port 43, and the fluid that fills the port 43 gradually flows toward the fluid outlet portion 42 through the liquid outlet 42a.

When the flow level of the fluid is to be reduced or when the valve is to be closed, the motor 15 may be operated so as to rotate the rotary shaft 15a of the motor 15 in a second direction (for example, in the counter-clockwise direction in FIG. 1 when viewed from above).

With the needle valve 10 according to this embodiment, a constant downward urging force (in the direction that closes the needle portion 14b of the diaphragm needle 14) is applied to the slider 17 by the spring 21, and the backlash between the female threaded portion 17a of the slider 17 and the male threaded portion 16c of the coupling 16 is reduced (or eliminated). Therefore, hysteresis in the flow level can be prevented (or eliminated) from occurring.

Figure 4:
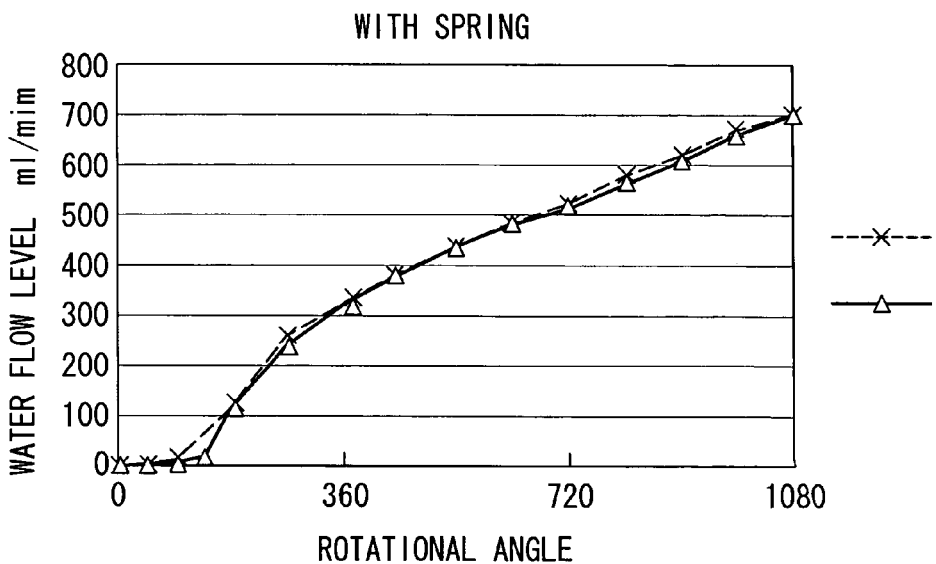
FIG. 4 is a graph illustrating the relationship between the rotational angle of a rotary shaft of a motor and flow, where FIG. 4(*a*) illustrates the measurement result using the needle valve illustrated in FIGS. 1 and 2 and FIG. 4(*b*) illustrates the measurement result using a known needle valve.
Figure 4:
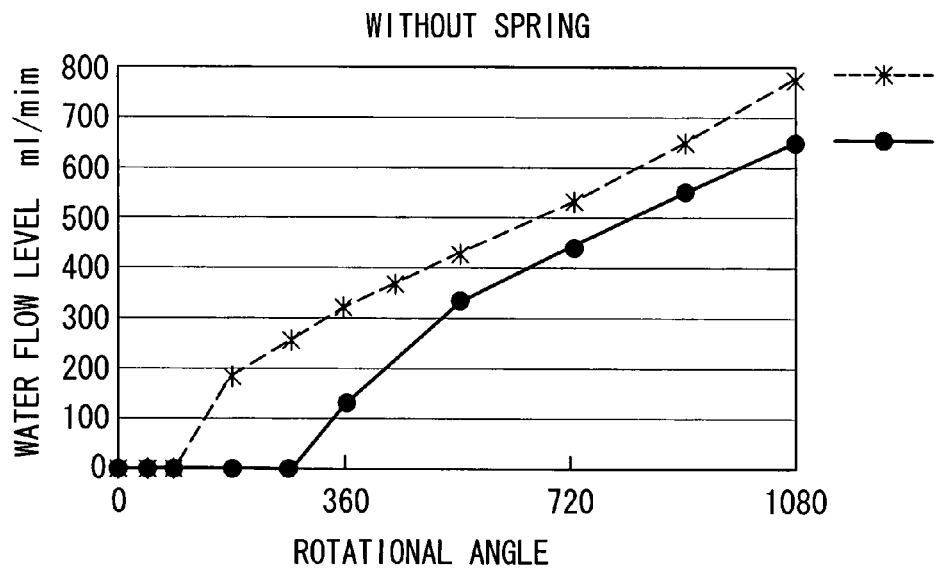

FIG. 4(a) illustrates a graph obtained by measuring the flow level at predetermined rotational angular intervals of the rotary shaft 15a when the rotary shaft 15a is rotated in a direction to close the needle valve 10 according to this embodiment, after the rotary shaft 15a is rotated by three revolutions from a closed position of the needle valve 10 in a direction to open the needle valve 10. The crosses in the graph represent the measurement values obtained when the needle valve 10 is opened from a closed state, and the triangles in the graph represent the measurement values obtained when the needle valve 10 is closed from an open state.

FIG. 4(b) is a graph illustrating the results of a measurement similar to that of FIG. 4(a) obtained by measuring the flow level when the rotary shaft 15a is rotated in a direction to close a needle valve that does not include the spring 21 configured to apply a downward urging force to the female threaded portion 17a, after the rotary shaft 15a is rotated by three revolutions in a direction to open the needle valve from a closed position of the needle valve. The stars in the graph represent the measurement values obtained when the needle valve is opened from a closed state, and the dots in the graph represent the measurement values obtained when the needle valve is closed from an open state.

In this way, with the needle valve 10 configured so that a downward urging force is constantly applied to the slider 17 by the spring 21, the difference in flow level due to the opening and closing of the valve, i.e., hysteresis in the flow level, can be significantly reduced or almost eliminated.

Since the liquid outlet 42a is provided in the upper area of the port 43, i.e., above the liquid inlet 41a, air bubbles generated inside the port 43 can be reduced or almost eliminated.

Furthermore, on the outer peripheral edge of the diaphragm needle 14, the protruding portion 14a is provided to protrude upward and the protruding portion 14d is provided to protrude downward. The protruding portions 14a and 14d are in close contact with and are stored in the depressed groove 20d of the diaphragm cover 20 and the depressed groove 12a of the body 12, respectively. Therefore, the flow of a (liquid) fluid from the lower area to the upper area of the diaphragm needle 14 can be prevented.

The packing 19 is interposed between the slider 17 and the stopper 18. The inner peripheral edge of the packing 19 is interposed between the slider 17 and the stopper 18, and the outer peripheral edge of the packing 19 is interposed between the diaphragm cover 20 and the cover flange 22. In this way, the first-surface side (the lower side in the drawing) and the second-surface side (the upper side in the drawing) of the packing 19, i.e., the diaphragm needle 14 side and the motor 15 side, can be completely separated. Thus, vaporized (liquid or gaseous) fluid (for example, a chemical solution, such as hydrofluoric acid) can be reliably prevented from entering the space accommodating the motor 15.

Furthermore, the communication channel 20c for communicating with the outer side of the needle valve 10 is provided in the body 12. In this way, gaseous fluid (vaporized gas of a chemical solution such as hydrofluoric acid, hydrochloric acid, or nitric acid) that builds up on the first-surface side of the needle valve 10 can be quickly discharged to the outside, thus preventing interference with the movement of the diaphragm needle 14. The communication channel 20c functions as a ventilation port and smoothens the movement of the diaphragm needle 14.

Second Embodiment

Figure 3:
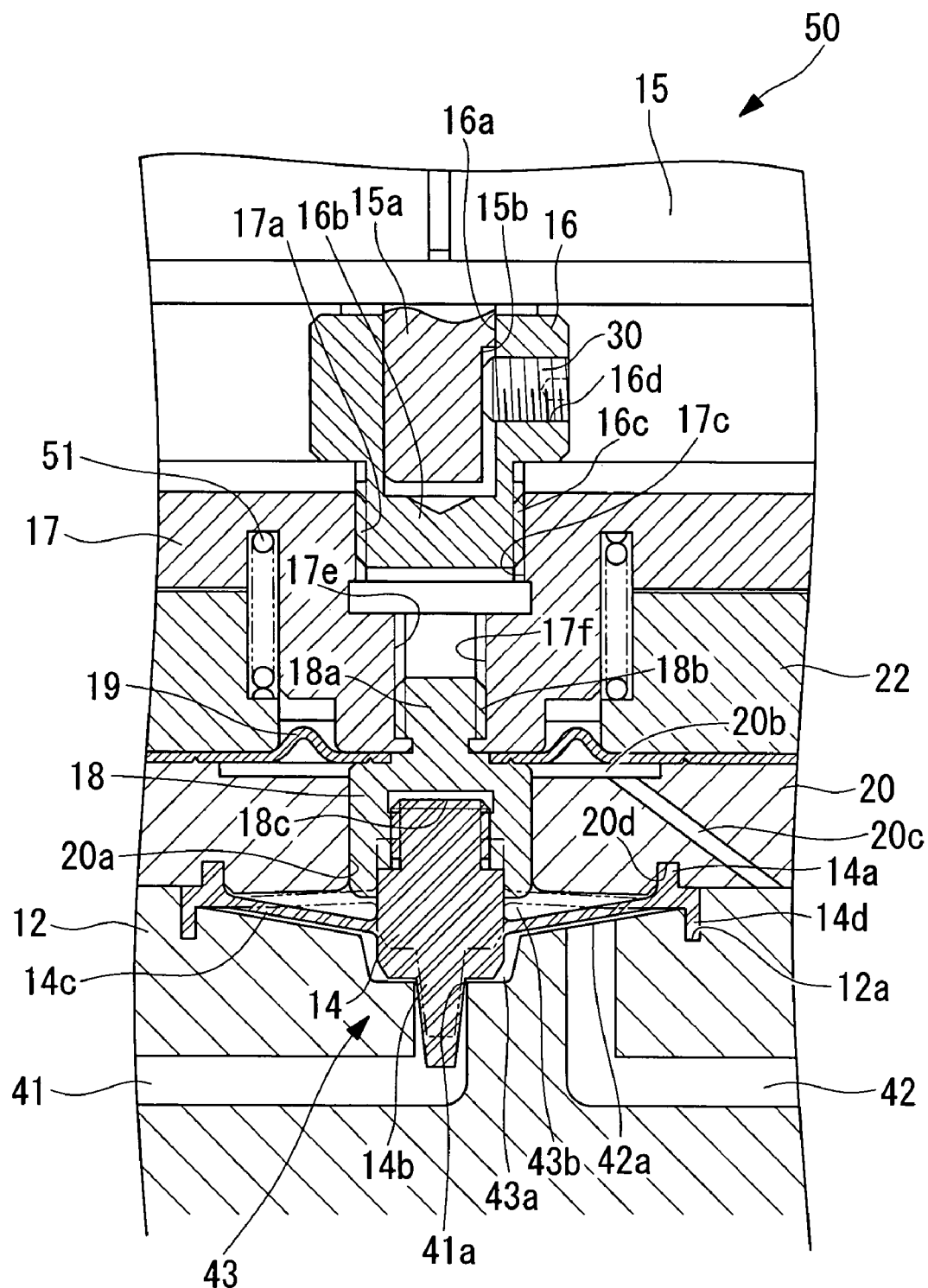
FIG. 3 illustrates a needle valve according to a second embodiment of the present invention and is similar to FIG. 2.

A needle valve according to a second embodiment of the present invention will be described with reference to FIG. 3.

A needle valve 50 differs from the above-described needle valve according to the first embodiment in that a spring 51 is provided instead of the spring 21. Other components are the same as those according to the above-described embodiment. Therefore, descriptions thereof are omitted here.

The components that are the same as those according to the first embodiment are indicated by the same reference numerals.

The spring 51 according to this embodiment is a compression coil spring interposed between the slider 17 and the cover flange 22 and constantly urges the slider 17 upward (toward the motor 15). In this way, the backlash between the female threaded portion 17a of the slider 17 and the male threaded portion 16c of the coupling 16 is reduced (or eliminated).

With the needle valve 50 according to this embodiment, configured as described above, the direction of force applied to the diaphragm needle 14 by the fluid passing through the port 43 matches the direction in which the spring 51 urges the slider 17. Therefore, fluctuation in the backlash between the female threaded portion 17a and the male threaded portion 16c caused by the pressure difference of the fluid can be substantially eliminated. Thus, the difference in the flow level due to opening and closing the valve, i.e., hysteresis in the flow level, can be substantially eliminated.

Since other advantages are the same as those according to the above-described embodiment, descriptions thereof are omitted here.

According to the above-described embodiment, the rotary shaft 15a and the slider 17 are connected via the coupling 16. However, the present invention is not limited thereto. For example, with the above-described embodiment, a male threaded portion may be provided directly on the outer surface of the rotary shaft 15a so as to eliminate the coupling 16.

In this way, the distance between the motor 15 and the slider 17 can be reduced, the length in the longitudinal direction (length in the vertical direction) of the needle valves 10 and 50 can be reduced, and the size of the valve can be reduced.

Third Embodiment

Figure 5:
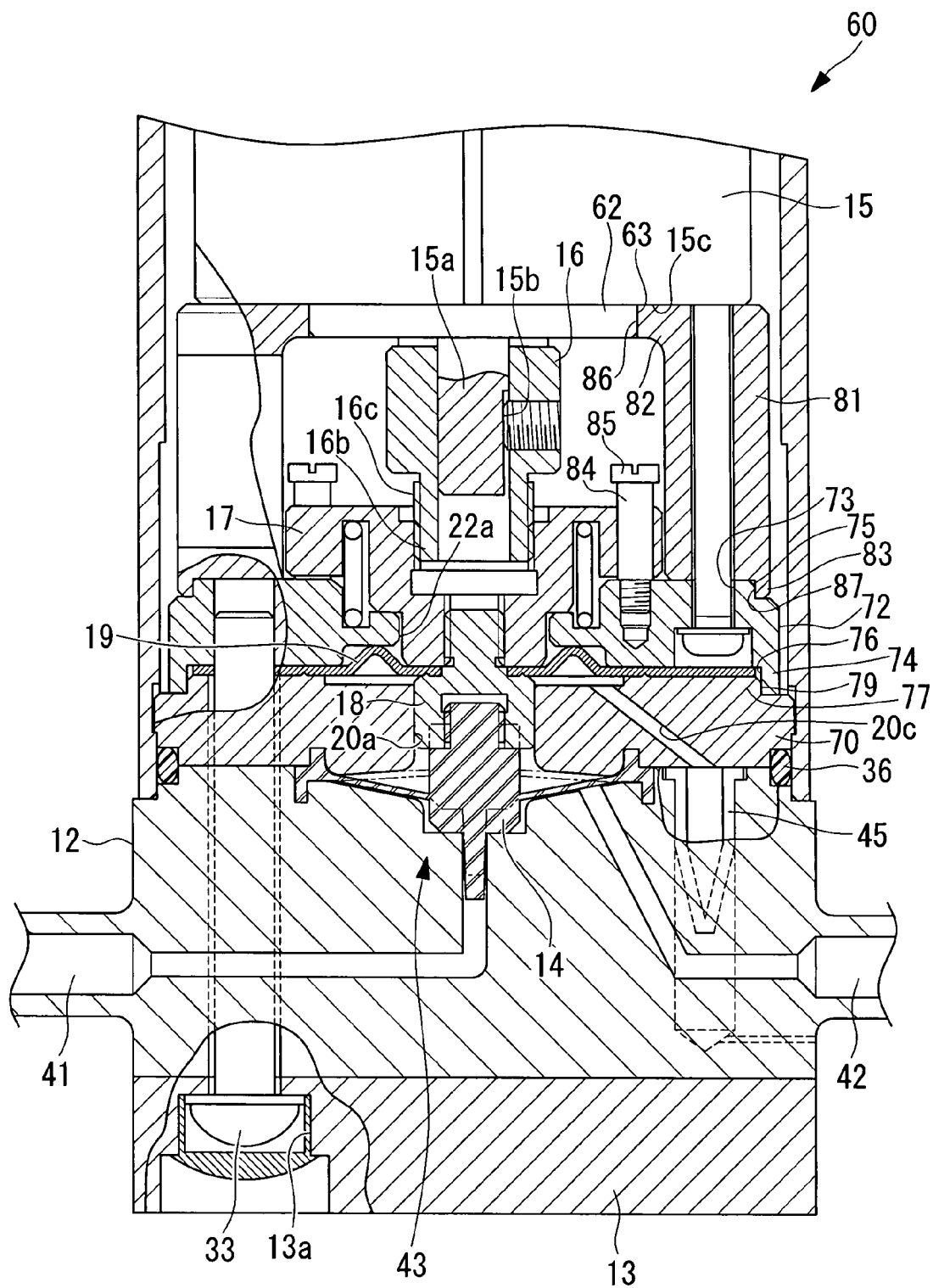
FIG. 5 is a longitudinal cross-sectional view illustrating a needle valve according to a third embodiment of the present invention.
Figure 6:
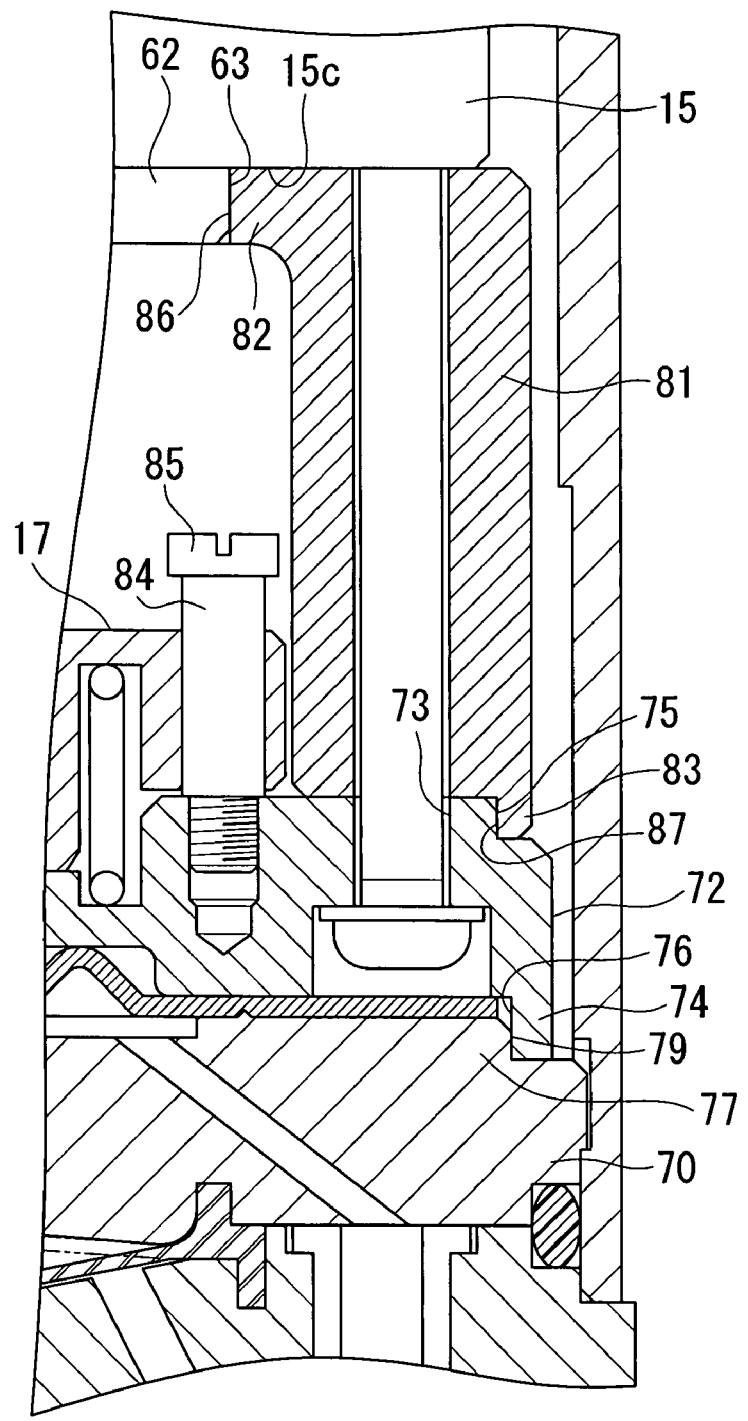
FIG. 6 is a partially enlarged view of FIG. 5.

A needle valve according to a third embodiment of the present invention will be described with reference to FIGS. 5 and 6.

A needle valve 60 differs from the needle valve 50 according to the second embodiment in that the structure of the attachment of the motor 15 to the body 12 differs. In the following, the components that are the same as those of the needle valve 50 according to the second embodiment are indicated by the same reference numerals, and detailed descriptions thereof are omitted.

The needle valve 60 according to this embodiment includes, as a fixing member that fixes the motor 15 to the body 12, a diaphragm cover 70, a cover flange 72, and a housing 81 having structures that differ, in part, from the structures of the diaphragm cover 20, the cover flange 22, and the motor shaft 31, respectively.

According to this embodiment, a column portion 62 protruding downward coaxially to the rotary shaft 15a from a lower surface 15c is provided at the lower edge of the motor 15. The outer peripheral surface of the column portion 62 is a first positioning reference surface 63.

The lower surface 15c of the motor 15 is plane substantially orthogonal to the rotary shaft 15a.

The rotary shaft 15a of the motor 15 is inserted inside the housing 81, which is a substantially cylindrical member allowing vertical displacement of the slider 17 inside the housing 81.

The column portion 62 of the motor 15 is inserted into an inner flange 82 provided at the upper edge of the housing 81. A ring-shaped protrusion 83 protruding downward from a lower edge surface is provided on the lower edge of the housing 81. According to this embodiment, the inner flange 82 and the protrusion 83 are coaxial with the axial line of the housing 81.

The inner peripheral surface of the inner flange 82 is shaped like a cylinder having an inner diameter substantially the same as the outer diameter of the column portion 62 of the motor 15. The inner peripheral surface is a first positioning surface 86 that positions the motor 15 coaxially to the axial line of the inner flange 82 by receiving the first positioning reference surface 63 of the motor 15.

The inner peripheral surface of the protrusion 83 is a second positioning reference surface 87 that is shaped like a cylinder coaxial to the first positioning surface 86.

A cylindrical portion 73 protruding upward is provided coaxially with a through-hole 22a on the upper surface of the cover flange 72. A ring-shaped protrusion 74 protruding downward is provided on the lower surface of the cover flange 72.

The cylindrical portion 73 is inserted inside the protrusion 83 of the housing 81. The outer peripheral surface of the cylindrical portion 73 is a cylindrical surface having a diameter substantially the same as the inner diameter of the protrusion 83 of the housing 81. This outer peripheral surface is a second positioning surface 75 that receives the second positioning reference surface 87 of the housing 81 so as to position the housing 81 coaxially with the through-hole 22a.

A ring-shaped portion that is positioned on the outside of the outer circumference of the cylindrical portion 73 on the upper surface of the cover flange 72 is on a plane substantially orthogonal to the through-hole 22a.

The inner peripheral surface of the protrusion 74 is a third positioning reference surface 76 that is shaped like a cylinder coaxial with the second positioning surface 75. The end surface (lower edge surface) of the protrusion 74 is a plane substantially orthogonal to the through-hole 22a.

A cylindrical portion 77 protruding upward is provided coaxially with the through-hole 20a on the upper surface of the diaphragm cover 70.

The cylindrical portion 77 is inserted inside the protrusion 74 of the cover flange 72. The outer peripheral surface of the cylindrical portion 77 is a cylindrical surface having a diameter substantially the same as the inner diameter of the protrusion 74 of the cover flange 72. This outer peripheral surface is a third positioning surface 79 that receives the third positioning reference surface 76 of the cover flange 72 so as to position the cover flange 72 coaxially with the through-hole 20a.

A ring-shaped portion on the outside of the outer circumference of the cylindrical portion 77 on the upper surface of the diaphragm cover 70 is positioned on a plane substantially orthogonal to the through-hole 20a.

The outer peripheral surface of the diaphragm cover 70 is received by the inner surface of the cover 23 mounted on the body 12, and the through-hole 20a is positioned coaxially with the diaphragm needle 14.

On the upper surface of the cover flange 72, a guiding pin 84 is mounted substantially parallel to the axial line of the rotary shaft 15a of the motor 15. The inner peripheral surface of the forked portion of the slider 17 contacts the outer peripheral surface of the guiding pin 84 instead of the outer peripheral surface of the motor shaft 31. In this way, co-rotation of the rotary shaft 15a and the slider 17 is prevented.

At the upper edge of the guiding pin 84, a stopper 85 that receives the upper surface of the slider 17 by protruding from the upper surface of the slider 17 is provided.

When the slider 17 is raised by rotating the rotary shaft 15a of the motor 15, the stopper 85 receives the slider 17 before the slider 17 contacts the base of the protruding portion 16b of the coupling 16 so as to prevent the slider 17 from rising further.

With the needle valve 60 configured as described above, the column portion 62 of the motor 15 is inserted into the inner flange 82 of the housing 81 when the motor 15 is installed on the body 12. In this way, the first positioning reference surface 63 of the motor 15 is received by the first positioning surface 86 of the housing 81, and the rotary shaft 15a of the motor 15 is disposed coaxially with the axial line of the inner flange 82 of the housing 81 and the protrusion 83.

At this state, the cylindrical portion 73 of the cover flange 72 is inserted inside the inner circumference of the protrusion 83 of the housing 81. In this way, the second positioning reference surface 87 of the housing 81 is received by the second positioning surface 75 of the cover flange 72, and the protrusion 83 of the housing 81 is disposed coaxially with the cylindrical portion 73, the protrusion 74, and the through-hole 22a of the cover flange 72. In other words, the rotary shaft 15a of the motor 15 is coaxial with the cylindrical portion 73, the protrusion 74, and the through-hole 22a of the cover flange 72.

In this state, the cylindrical portion 77 of the diaphragm cover 70 is inserted inside the inner circumference of the protrusion 74 of the cover flange 72. In this way, the third positioning reference surface 76 of the cover flange 72 is received by the third positioning surface 79 of the diaphragm cover 70, and the protrusion 74 of the cover flange 72 is disposed coaxially with the cylindrical portion 77 and the through-hole 20a of the diaphragm cover 70. In other words, the rotary shaft 15a of the motor 15 is coaxial with the cylindrical portion 77 and the through-hole 20a of the diaphragm cover 70.

The diaphragm cover 70 is positioned with respect to the body 12 so that the through-hole 20a is coaxial with the diaphragm needle 14. Therefore, the rotary shaft 15a of the motor 15 is also coaxial with the diaphragm needle 14.

In this way, with the needle valve 60 according to this embodiment, the motor 15, the housing 81, the cover flange 72, and the diaphragm cover 70 are connected by a so-called spigot. Therefore, by simply connecting these components, both the position and the orientation of the motor 15 with respect to the body 12 are suitably set for driving the diaphragm needle 14. Thus, the position adjustment operation and the orientation adjustment operation of the motor 15 with respect to the body 12 are not required.

Therefore, the needle valve 60 can be assembled highly accurately regardless of the level of technical skill of the assembly worker during manufacturing and maintenance. Therefore, productivity and ease-of-operation are excellent, and the variation in assembly accuracy from product to product or each maintenance operation is reduced. Thus, the level of performance of the flow control valve can be kept high.

Here, the above-described positioning reference surfaces are not limited to cylindrical surfaces or cylindrical inner surfaces, as described above. Instead, each positioning reference surface may be constituted of at least one curved surface or a plurality of flat surfaces including at least one surface that is orientated in a direction different from those of the other surfaces. When the positioning reference surface is a curved surface, the corresponding positioning surface is constituted of a curved surface having the same curvature, but in the opposite direction, as that of the positioning reference surface.

When the positioning reference surface provided on the motor or the fixing member is constituted of a plurality of flat surfaces, the positioning surface of the member connected to the positioning reference surface is also constituted of a plurality of flat surfaces corresponding to those of the positioning reference surface.

With the needle valve 60, the stopper 85 is provided on the guiding pin 84 that prevents co-rotation of the slider 17. In this way, the interference between the slider 17 and the base of the protruding portion 16b of the coupling 16 is prevented when the slider 17 is raised. Accordingly, problems, such as overscrewing, of these components are reliably prevented, and excellent operation can always be achieved.

The characteristic structure according to this embodiment can be applied to, not only, the needle valve 50 according to the second embodiment but also to the needle valve 10 according to the first embodiment.

Fourth Embodiment

Figure 7:
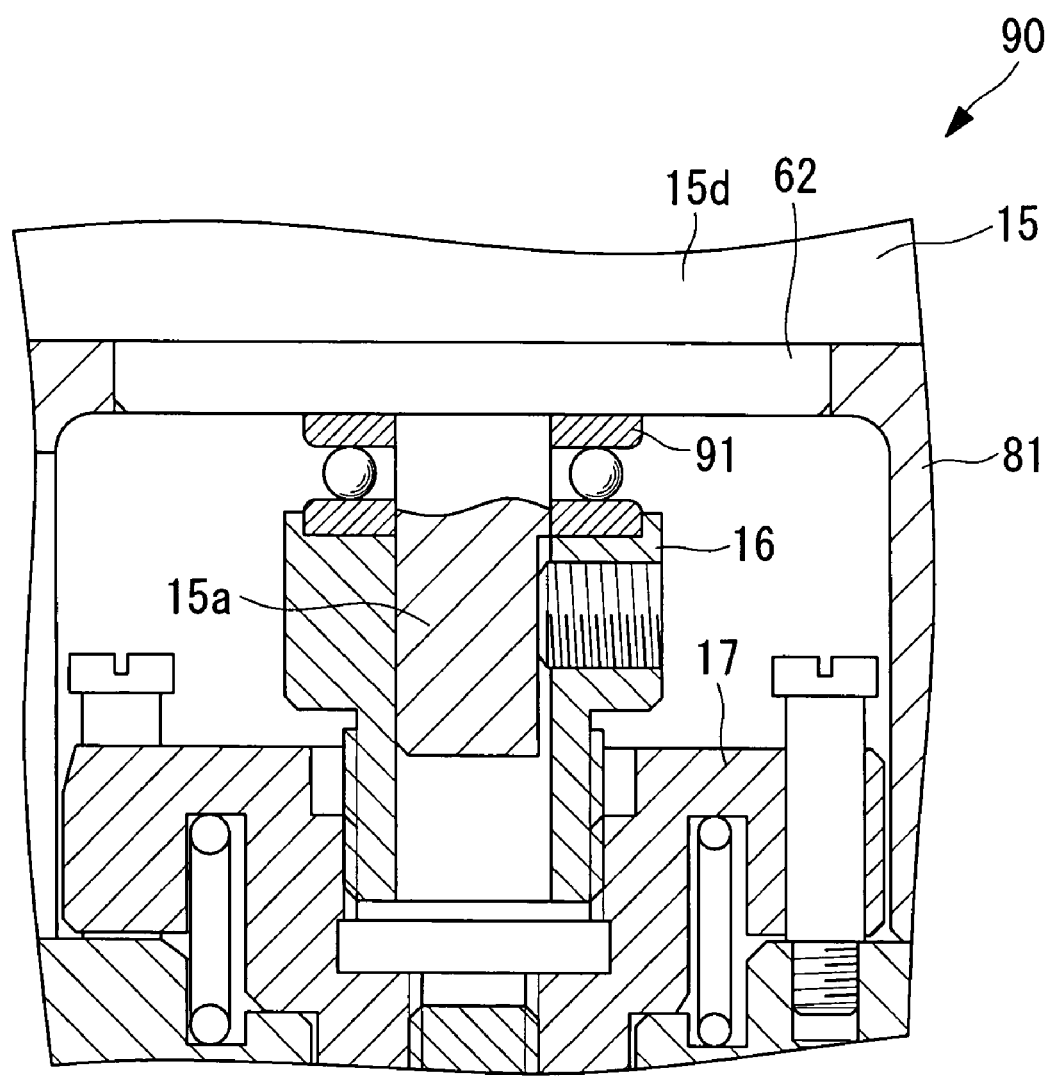
FIG. 7 is a longitudinal cross-sectional view illustrating a needle valve according to a fourth embodiment of the present invention.

A needle valve according to a fourth embodiment of the present invention will be described below with reference to FIG. 7.

A needle valve 90 differs from the needle valve 60 according to the third embodiment in that a thrust bearing 91 that receives the thrust load applied to the rotary shaft 15a is provided on an external portion of a motor main body 15d of the motor 15. In the following, the components that are the same as those of the needle valve 60 according to the third embodiment are indicated by the same reference numerals, and detailed descriptions thereof are omitted.

According to this embodiment, the thrust bearing 91 is interposed between the lower surface of the column portion 62 of the motor 15 and the upper surface of the coupling 16.

With the needle valve 90 having the structure described above, the thrust load that should be transmitted to the rotary shaft 15a via the diaphragm needle 14, the slider 17, and the coupling 16 when the diaphragm needle 14 receives pressure from a fluid is received by the thrust bearing 91 provided on the external portion of the motor main body 15d and is released to the motor main body 15d. Therefore, the load applied to the supporting structure of the rotary shaft 15a inside the motor 15 is reduced, and the performance of the motor 15 can be maintained for a long period of time.

The structure according to this embodiment may be applied not only to the needle valve 60 according to the third embodiment, but also to the needle valve 10 according to the first embodiment and the needle valve 50 according to the second embodiment.

Fifth Embodiment

Figure 8:
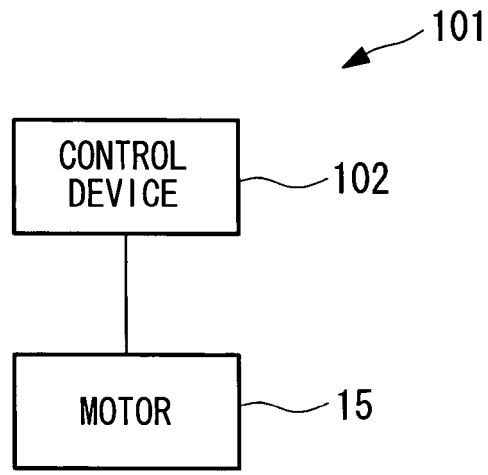
FIG. 8 is a longitudinal cross-sectional view illustrating a needle valve according to a fifth embodiment of the present invention.

A needle valve according to a fifth embodiment of the present invention will be described below with reference to FIGS. 8 and 9.

A needle valve 101 according to this embodiment is the same as any of the needle valves according to the first, second, third, and fourth embodiments, except that the motor 15 is a stepping motor and that a control device 102 that controls the operation of the motor 15 is provided.

To correct the position of the diaphragm needle 14, the control device 102 inputs to the motor 15 a pulsed signal having a number of pulses for rotating the diaphragm needle 14 by an angle required for moving the diaphragm needle 14 from one end to the other end in its movable range, determines that the diaphragm needle 14 is positioned at the other end in the movable range when the rotary shaft 15*a* stops, and then controls the position of the diaphragm needle 14 within the movable range.

More specifically, to correct the position of the diaphragm needle 14, the control device 102 inputs to the motor 15*a* pulsed signal having a predetermined number of pulses that rotates the rotary shaft 15*a* of the motor 15 by an angle required for moving the diaphragm needle 14 from one end to the other end in a movable range (this angle is determined from the design information of the needle valve 101).

Figure 9:
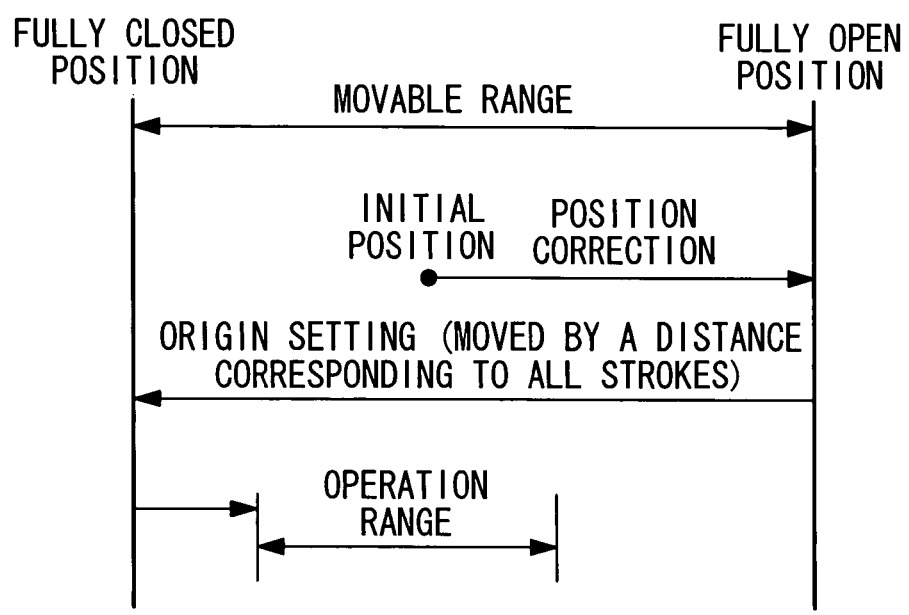
FIG. 9 is a longitudinal cross-sectional view illustrating a needle valve illustrated in FIG. 8.

As shown in FIG. 9, according to this embodiment, to correct the position of the diaphragm needle 14, the control device 102 rotates the rotary shaft 15*a* in the direction that moves the diaphragm needle 14 toward the opening side in the movable range (upward in FIGS. 1, 2, 3, 5, and 7) and moves the diaphragm needle 14 to the fully open position.

In this way, when the rotation of the rotary shaft 15*a* is completed, the diaphragm needle 14 is positioned at the other end in the movable range, regardless of the position of the diaphragm needle 14 when the position correction operation is started. When the diaphragm needle 14 is positioned at a point other than one end in the movable range when the position correction operation of the diaphragm needle 14 is started, the diaphragm needle 14 reaches the other end in the movable range before the rotary shaft 15*a* is rotated by an angle corresponding to all of the pulses of the pulsed signal input to the motor 15. Therefore, subsequently, the rotary shaft 15*a* does not rotate, regardless of the remaining number of pulses.

After positioning the diaphragm needle 14 at the other end in the movable range, as described above, the control device 102 determines that the diaphragm needle 14 is positioned at the other end in the movable range, and position control of the diaphragm needle 14 is carried out within the movable range.

According to this embodiment, the control device 102 inputs a pulsed signal having a number of pulses sufficient for moving the diaphragm needle 14 to one end (fully closed position) in the movable range after the rotary shaft 15*a* is stopped, and sets the position where the rotary shaft 15*a* stopped as the origin of position control of the diaphragm needle 14. Subsequently, the control device 102 moves the diaphragm needle 14 within a predetermined operation range and carries out necessary controls.

When the diaphragm needle 14 is within the movable range, the rotary shaft rotates at an angle corresponding to all pulses of the pulsed signal input to the motor 15. Therefore, a predetermined relationship is established between the number of pulses of the pulsed signal and the position of the diaphragm needle 14.

Accordingly, with the needle valve 101 according to this embodiment, the diaphragm needle 14 is temporarily positioned at the other end in the movable range, and then, the position of the diaphragm needle 14 can be determined on the basis of the number of pulses of the pulsed signal input to the motor 15. In this way, an accurate position of the diaphragm needle 14 can be determined without using a rotary encoder.

According to this embodiment, to correct the position of the diaphragm needle 14, the diaphragm needle 14 is moved toward the opening side, i.e., in a direction that prevents interference with the needle-storing portion 43*a* of the needle valve 101. Therefore, even when correction of the position of the diaphragm needle 14 is repeated, the diaphragm needle 14 and the body 12 are less likely to be damaged.

When the technique according to this embodiment is applied to the needle valve according to the first or second embodiment, the control device 102 may rotate the rotary shaft 15*a* of the motor 15 with a first driving torque at least when the diaphragm needle 14 moves toward the end when in the vicinity of the end of the movable range, and, when the diaphragm needle 14 moves away from the end of the movable range, the rotary shaft 15*a* of the motor 15 may be rotated with a second driving torque that is greater than the first driving torque.

In such a case, to move the diaphragm needle 14 away from the end of the movable range, the control device 102 that controls the operation of the motor 15 operates the motor 15 with the second driving torque that is greater than the driving torque (first driving torque) used to move the diaphragm needle 14 up to the end of the movable range.

In this way, with this needle valve, even when overscrewing of the threaded portion occurs when the diaphragm needle 14 moves up to the end of the movable range, the overscrewing can be easily resolved.

The driving force of the motor 15 is proportional to the driving current supplied to the motor 15.

Thus, the above-described control by the control device 102 is possible by setting the output limit value of the driving current of the motor 15 to a first limit value V1 when the diaphragm needle 14 is moved up to the end of the movable range and by setting the output limit value to a second limit value V2 that is greater than the first limit value V1 when the diaphragm needle 14 is moved away from the end of the movable range.

With the motor 15, the smaller the rotational speed of the rotary shaft 15*a*, the greater the torque for driving the rotary shaft 15*a*.

Thus, the above-described control by the control device 102 can be realized by rotating the rotary shaft 15*a* of the motor 15 at a first rotational speed R1 when the diaphragm needle 14 is moved up to the end of the movable range and by rotating the rotary shaft 15*a* at a second rotational speed R2 that is slower than the first rotational speed R1 when the diaphragm needle 14 is moved away from the end of the movable range.

The invention claimed is:

1. A flow control valve comprising:
a body having a fluid inlet and a fluid outlet;
a cover attachable to the body;
a motor disposed in a space defined by the body and the cover;
at least two fixing members fixing the motor to the body;
a valving element connected to a rotary shaft of the motor with a screw member;

a slider that is raised and lowered along the rotary shaft of the motor;

an urging member that urges the valving element toward a motor side or toward a valving element side opposite to the motor side;

packing that physically separates the space into the motor side and the valving element side and prevents fluid communication between the valving element side and the motor side; and a discharge channel that discharges a fluid that has accumulated on a side closer to the valving element than to the packing, wherein, the packing is made of a material that does not permit passage of vaporized chemical solution between the valving element side and the motor side, the packing has a circular hole at a center part, an inner peripheral edge around the circular hole, and an outer peripheral edge, and the packing is fixed by the inner peripheral edge being interposed between the slider and the valving element, and by the outer peripheral edge being interposed between the at least two fixing members.

2. The flow control valve according to claim 1, wherein the urging member is provided in a manner such that the direction of force applied to the valving element by a fluid flowing around the valving element and the direction of the urging force by the urging member are substantially the same.

3. The flow control valve according to claim 1, further comprising:
a check valve provided inside the discharge channel.

4. The flow control valve according to claim 1, further comprising:
a positioning reference surface provided on the motor,
wherein each of the fixing members includes a positioning surface for positioning the motor, the positioning surface receives the positioning reference surface of the motor so as to set at least one of position and orientation of the rotary shaft suitable for driving the valving element.

5. The flow control valve according to claim 4,
wherein the positioning reference surface of the motor constitutes a cylindrical surface or a cylindrical inner surface parallel to the rotary shaft,
wherein the positioning surface of each said fixing member constitutes a cylindrical inner surface or a cylindrical surface that is parallel to a driving direction of the valving element and the same shape as the positioning reference surface, and
wherein the position and orientation of the rotary shaft are determined while the positioning surface receives the positioning reference surface.

6. The flow control valve according to claim 1, further comprising:
a stopper that allows the valving element to move within a predetermined operation range and receives the valving element upon reaching an end of the operation range to prevent the valving element from moving outside the operation range.

7. The flow control valve according to claim 1, further comprising:
a control device that controls the operation of the motor,
wherein the control device operates the motor with a first driving torque at least when the valving element moves toward the end when in the vicinity of the end of the movable range, and
wherein the control device operates the motor with a second driving torque that is greater than the first driving torque when the valving element moves away from the end in the movable range.

8. The flow control valve according to claim 1,
wherein the valving element comprises a needle of a needle valve,
wherein the motor constitutes a stepping motor that rotates the rotary shaft by an angle proportional to a number of pulses an input pulsed signal,
wherein a control device that controls the position of the valving element by controlling the operation of the motor is provided,
wherein, to correct the position of the valving element, the control device inputs a pulsed signal having a number of pulses for rotating the rotary shaft by an angle required for moving the valving element from one end to the other end of the movable range of the valving element, and
wherein the control device determines that the valving element is positioned at the other end of the movable range when the rotary shaft is stopped and subsequently controls the position of the valving element within the movable range.

9. The flow control valve according to claim 8, wherein to correct the position of the valving element, the control device rotates the rotary shaft in a direction in which the valving element moves toward an opening side within the movable range.

10. The flow control valve according to claim 8,
wherein the control device operates the motor with a first driving torque at least when the valving element moves toward the end when in the vicinity of the end of the movable range, and
wherein the control device operates the motor with a second driving torque that is greater than the first driving torque when the valving element moves away from the end of the movable range.

11. The flow control valve according to claim 1, further comprising:
a thrust bearing provided on the outside portion of a motor body of the motor, the thrust bearing receiving thrust load applied to the rotary shaft.

12. The flow control valve according to claim 1, wherein the packing is made of a material that does not permit passage of gas between the valving element side and the motor side.

13. The flow control valve according to claim 1, wherein the packing is made of a material that does not permit passage of vaporized liquid between the valving element side and the motor side.

14. The flow control valve according to claim 1, wherein the inner peripheral edge of the packing being interposed between the slider and the valving element allows the center part of the packing to follow movement of the valving element so that spaces above and below the packing associated with the motor side and the valving element side remain physically separated.

* * * * *